US012516880B2

(12) United States Patent
Zheng et al.

(10) Patent No.: US 12,516,880 B2
(45) Date of Patent: Jan. 6, 2026

(54) DRYING METHOD FOR POLYGLYCOLLIDE WARP-KNITTED SUPPORT MESHES FOR ARTIFICIAL SKIN

(71) Applicant: Haixi New Textile Material of Jinjiang Industrial Technology Academy, Fujian (CN)

(72) Inventors: Xiaojia Zheng, Fujian (CN); Yunbo Zheng, Fujian (CN); Xiaoxin Zhu, Fujian (CN); Weiwei Wu, Fujian (CN)

( * ) Notice: Subject to any disclaimer, the term of this patent is extended or adjusted under 35 U.S.C. 154(b) by 778 days.

(21) Appl. No.: 17/900,218

(22) Filed: Aug. 31, 2022

(65) Prior Publication Data

US 2023/0073585 A1 Mar. 9, 2023

(30) Foreign Application Priority Data

Sep. 3, 2021 (CN) ......................... 202111034579.X

(51) Int. Cl.
*F26B 7/00* (2006.01)
*F26B 3/04* (2006.01)
*F26B 5/04* (2006.01)

(52) U.S. Cl.
CPC .................. *F26B 7/00* (2013.01); *F26B 3/04* (2013.01); *F26B 5/045* (2013.01)

(58) Field of Classification Search
CPC ............... F26B 7/00; F26B 3/04; F26B 5/045
USPC ............................................................ 34/403
See application file for complete search history.

(56) References Cited

U.S. PATENT DOCUMENTS 1,675,076 A * 6/1928 Wurfflein .................. F26B 7/00 34/497
2,803,889 A * 8/1957 Ushakoff .................. C14B 1/58 156/216
3,425,137 A * 2/1969 Lambert ................. F26B 5/045 34/92
5,647,142 A * 7/1997 Andersen .................. F26B 3/08 34/373
6,182,375 B1 * 2/2001 Banerjee ............... F26B 17/026 264/109
6,184,193 B1 * 2/2001 Yamada .............. D06M 13/152 510/462
8,844,158 B2 * 9/2014 Dehn ..................... D04H 1/407 34/282
9,915,473 B2 * 3/2018 Llan .......................... F26B 7/00
11,612,631 B2 * 3/2023 Datt .................. A61F 13/01012 424/449
12,246,266 B2 * 3/2025 Andrews ................. F26B 25/06
12,305,917 B1 * 5/2025 Liu ......................... F26B 21/10
2023/0073585 A1 * 3/2023 Zheng ..................... F26B 13/00
2025/0235077 A1 * 7/2025 Kim ...................... A47L 23/205

FOREIGN PATENT DOCUMENTS

| | | | | | |
|---|---|---|---|---|---|
| CN | 103087516 | A | | 5/2013 | |
| CN | 105571272 | A | | 5/2016 | |
| CN | 105887245 | A | | 8/2016 | |
| CN | 105970657 | A | | 9/2016 | |
| CN | 107028262 | U | | 8/2017 | |
| CN | 107326533 | A | | 11/2017 | |
| CN | 108534467 | A | | 9/2018 | |
| CN | 110258023 | A | | 9/2019 | |
| CN | 110857530 | A | | 3/2020 | |
| CN | 210374476 | A | | 4/2020 | |
| CN | 112726015 | A | | 4/2021 | |
| CN | 213657304 | U | | 7/2021 | |
| CN | 113670005 | B | * | 6/2022 | ................ F26B 3/04 |
| EP | 3281614 | A1 | * | 2/2018 | ............. A61K 36/47 |
| GB | 948970 | A | | 2/1964 | |
| JP | 2023037597 | A | * | 3/2023 | .............. F26B 21/14 |

* cited by examiner

*Primary Examiner* — Stephen M Gravini

(57) ABSTRACT

The invention relates to a drying method for polyglycollide warp-knitted support meshes for artificial skin, specifically comprising: pre-drying, deep drying, and fabric stress relaxation, which are performed sequentially. The drying method can completely remove water in polyglycollide warp-knitted support meshes as well as solvents left during the cleaning process, and can effectively maintain the properties such as tensile strength, pore size, and weight of the polyglycollide warp-knitted support meshes, thus being of great significance for the application of the polyglycollide warp-knitted support meshes in the field of medical artificial skin.

5 Claims, No Drawings

DRYING METHOD FOR POLYGLYCOLLIDE WARP-KNITTED SUPPORT MESHES FOR ARTIFICIAL SKIN

This application claims priority to China Application No. CN202111034579.X, filed Sep. 3, 2021, which is incorporated herein by reference in its entirety.

BACKGROUND OF THE INVENTION

1. Technical Field

The invention belongs to the technical field of new biomedical textile materials, and particularly, relates to a drying method for polyglycollide warp-knitted support meshes for artificial skin.

2. Description of Related Art

Polyglycollide warp-knitted support meshes are prepared from polyglycollide yams through winding, warping, knitting, shaping, and cleaning, and have broad application prospects in fields such as medical artificial skin. However, it is difficult to completely remove residual water (mainly including free water and bound water) and solvents (mainly referring to solvents for removing oil stains and dust on the polyglycollide warp-knitted support meshes) in the polyglycollide warp-knitted support meshes after the polyglycollide warp-knitted support meshes are cleaned. The residual water and solvents may accelerate the degradation of the polyglycollide warp-knitted support meshes, and have a great impact on the mechanical properties of the polyglycollide warp-knitted support meshes, as well as the application of the polyglycollide warp-knitted support meshes to artificial skin. The water and solvents in the polyglycollide warp-knitted support meshes can be completely removed through high-temperature treatment, but the high temperature, as well as oxygen and water vapor in air, may lead to rapid degradation of polyglycollide, thus severely reducing the mechanical properties of the polyglycollide warp-knitted support meshes. So, it is particularly important to research and explore a drying method suitable for the polyglycollide warp-knitted support meshes.

BRIEF SUMMARY OF THE INVENTION

In view of the defects of the prior art, the technical issue to be settled by the invention is to provide a drying method for polyglycollide warp-knitted support meshes for artificial skin, which can completely remove water in the polyglycollide warp-knitted support meshes, as well as solvents left during the cleaning process, and can effectively maintain the properties such as tensile strength, pore size, and weight of the polyglycollide warp-knitted support meshes.

To settle the above technical issue, the technical solution adopted by the invention is as follows:

A drying method for polyglycollide warp-knitted support meshes for artificial skin specifically comprises: pre-drying, deep drying, and fabric stress relaxation, which are performed sequentially.

Preferably, the pre-drying is completed in a vacuum drying oven A, and the vacuum drying oven A is connected to a water-circulation vacuum pump.

Preferably, the process of pre-drying comprises: placing a polyglycollide warp-knitted support mesh, which is aired after being cleaned, in the vacuum drying oven A, and setting a temperature in the vacuum drying oven A as $T_1$;

starting the water-circulation vacuum pump, keeping the vacuum drying oven running to treat the polyglycollide warp-knitted support mesh in the vacuum drying oven A under a vacuum degree $P_1$ for a time $t_1$, and then stopping the water-circulation vacuum pump; and slowly introducing air into the vacuum drying oven A to enable the vacuum drying oven A to return to normal pressure.

Preferably, the temperature $T_1$ is 25° C.-35° C., the vacuum degree $P_1$ is 0-400 Pa, and the treatment time $t_1$ is 1-2.5 h.

Preferably, the deep drying and the fabric stress relaxation are completed in a vacuum drying oven B, and the vacuum drying oven B is connected to a sliding-vane rotary vacuum pump and an inert gas connecting tube.

Preferably, the process of deep drying comprises:

(1) Placing the polyglycollide warp-knitted support mesh in the vacuum drying oven B;

(2) At normal temperature, starting the sliding-vane rotary vacuum pump to decrease a vacuum degree of the vacuum drying oven B to $P_2$, then stopping the sliding-vane rotary vacuum pump, and introducing an inert gas into the vacuum drying oven B to enable the vacuum drying oven B to return to normal pressure;

(3) Performing Step (2) multiple times;

(4) Starting the sliding-vane rotary vacuum pump, keeping the sliding-vane rotary vacuum pump running to perform drying treatment on the polyglycollide warp-knitted support mesh in the vacuum drying oven B under a vacuum degree $P_2$ and a temperature $T_2$ for a time $t_2$; and (5) Under the condition where the vacuum degree of the vacuum drying oven B is maintained at $P_2$, increasing the temperature in the vacuum drying oven B to $T_3$ at a heating rate T, maintaining the temperature in the vacuum drying oven B at $T_3$ to treat the polyglycollide warp-knitted support mesh for a time $t_3$, and stopping the sliding-vane rotary vacuum pump.

Preferably, the inert gas is one of nitrogen, argon, and helium.

Preferably, the vacuum degree $P_2$ of the vacuum drying oven B is 0-50 Pa, Step (2) is performed two or more times in Step (3), the temperature $T_2$ is 65° C.-75° C., the time $t_2$ is 3-5 h, the heating rate T is 16° C./h-24° C./h, the temperature $T_3$ is 85° C.-105° C., and the time $t_3$ is 1/3-1 h.

Preferably, the process of fabric stress relaxation comprises: introducing an inert gas into the vacuum drying oven B at a rate V, increasing the temperature in the vacuum drying box B to $T_4$, treating the polyglycollide warp-knitted support mesh at the temperature $T_4$ for a time $t_4$, and then cooling the vacuum drying box B to normal temperature.

Preferably, the rate V is 0.1 L/min-1 i/min, the temperature $T_4$ is 110° C.-130° C., and the time $t_4$ is 3-5 h.

Preferably, a purity of the inert gas is equal to or over 98%.

Compared with the prior art, the invention has the following beneficial effects:

The drying method provided by the invention comprises pre-drying, deep drying, and stress relaxation, wherein all residual cleaning solvents and part of free water in the warp-knitted support mesh are removed through pre-drying, all free water and bound water are removed through deep drying, and internal stress of the warp-knitted support mesh generated in the previous process is relaxed through stress relaxation; in this way, the drying method for polyglycollide warp-knitted support meshes for artificial skin can completely remove water in the polyglycollide warp-knitted support meshes, as well as solvents left during the cleaning process, and can effectively maintain the properties such as tensile strength, pore size, and weight of the polyglycollide warp-knitted support meshes, thus being of great significance for the application of the polyglycollide warp-knitted support meshes in the field of artificial skin.

DETAILED DESCRIPTION OF THE INVENTION

The invention will be described in further detail below with reference to specific implementations. Those skilled in the art would appreciate that the following examples are merely used to explain the invention, and should not be construed as limitations of the scope of the invention.

Example 1

This example provides a drying method for polyglycollide warp-knitted support meshes for artificial skin, specifically comprising: pre-drying, deep drying, and fabric stress relaxation, which are performed sequentially.

The process of pre-drying comprises: a polyglycollide warp-knitted support mesh, which was aired after being cleaned, was placed in a vacuum drying oven A connected to a water-circulation vacuum pump, and a temperature in the vacuum drying oven A was set to 25° C.; the water-circulation vacuum pump was started and kept running to perform drying treatment on the polyglycollide warp-knitted support mesh under a vacuum degree of 390 Pa for 1 h, and then the water-circulation vacuum pump was stopped; air was slowly introduced into the vacuum drying oven A to enable the vacuum drying oven A to return to normal pressure.

The process of deep drying comprises:

(1) The polyglycollide warp-knitted support mesh was taken out of the vacuum drying oven A, and was placed in a vacuum drying oven B connected to a sliding-vane rotary vacuum pump and a nitrogen connecting tube;

(2) At normal temperature, the sliding-vane rotary vacuum pump was started to decrease a vacuum degree of the vacuum drying oven B to 50 Pa, then the sliding-vane rotary vacuum pump was stopped, and nitrogen with a purity of 98.98% was introduced into the vacuum drying oven B to enable the vacuum drying oven B to return to normal pressure;

(3) Step (2) was performed three times;

(4) The sliding-vane rotary vacuum pump was started and kept running to perform drying treatment on the polyglycollide warp-knitted support mesh under the vacuum degree of 50 Pa and a temperature of 65° C. for 3 h;

(5) Under the condition where the vacuum degree of the vacuum drying oven B is maintained at 50 Pa, the temperature in the vacuum drying oven B was increased to 95° C. at a heating rate of 18° C./h and was maintained at 95° C. to treat the polyglycollide warp-knitted support mesh for 0.5 h, and then, the sliding-vane rotary vacuum pump was stopped.

The process of fabric stress relaxation comprises: nitrogen was introduced into the vacuum drying oven B at a rate of 0.5 L/min, the temperature in the vacuum drying oven B was increased to 115° C., and the polyglycollide warp-knitted support mesh was treated at the temperature of 115° C. for 4 h; then, the vacuum drying oven B was decreased to normal temperature and the polyglycollide warp-knitted support mesh was taken out of the vacuum drying oven B.

The weft tensile strength of the polyglycollide warp-knitted support mesh is 800 MPa, the warp tensile strength of the polyglycollide warp-knitted support mesh is 1300 MPa, the weight of the polyglycollide warp-knitted support mesh is 30 $g/m^2$, and the pore size of the polyglycollide warp-knitted support mesh is 800 μm.

Example 2

This example provides a drying method for polyglycollide warp-knitted support meshes for artificial skin, specifically comprising: pre-drying, deep drying, and fabric stress relaxation, which are performed sequentially.

The process of pre-drying comprises: a polyglycollide warp-knitted support mesh, which was aired after being cleaned, was placed in a vacuum drying oven A connected to a water-circulation vacuum pump, and a temperature in the vacuum drying oven A was set to 30° C.; the water-circulation vacuum pump was started and kept running to perform drying treatment on the polyglycollide warp-knitted support mesh under a vacuum degree of 350 Pa for 1.5 h, and then the water-circulation vacuum pump was stopped; air was slowly introduced into the vacuum drying oven A to enable the vacuum drying oven A to return to normal pressure.

The process of deep drying comprises:

(1) The polyglycollide warp-knitted support mesh was taken out of the vacuum drying oven A, and was placed in a vacuum drying oven B connected to a sliding-vane rotary vacuum pump and a nitrogen connecting tube;

(2) At normal temperature, the sliding-vane rotary vacuum pump was started to decrease a vacuum degree of the vacuum drying oven B to 30 Pa, then the sliding-vane rotary vacuum pump was stopped, and nitrogen with a purity of 99.99% was introduced into the vacuum drying oven B to enable the vacuum drying oven B to return to normal pressure;

(3) Step (2) was performed two times;

(4) The sliding-vane rotary vacuum pump was started and kept running to perform drying treatment on the polyglycollide warp-knitted support mesh under the vacuum degree of 30 Pa and a temperature of 70° C. for 4 h;

(5) Under the condition where the vacuum degree of the vacuum drying oven B is maintained at 30 Pa, the temperature in the vacuum drying oven B was increased to 100° C. at a heating rate of 20° C./h and was maintained at 100° C. to treat the polyglycollide warp-knitted support mesh for 0.6 h, and then, the sliding-vane rotary vacuum pump was stopped.

The process of fabric stress relaxation comprises: nitrogen was introduced into the vacuum drying oven B at a rate of 0.6 L/min, the temperature in the vacuum drying oven B was increased to 120° C., and the polyglycollide warp-knitted support mesh was treated at the temperature of 120° C. for 4 h; then, the vacuum drying oven B was decreased to normal temperature, and the polyglycollide warp-knitted support mesh was taken out of the vacuum drying oven B, so that drying is completed.

The weft tensile strength of the polyglycollide warp-knitted support mesh is 861 MPa, the warp tensile strength of the polyglycollide warp-knitted support mesh is 1257 MPa, the weight of the polyglycollide warp-knitted support mesh is 28 $g/m^2$, and the pore size of the polyglycollide warp-knitted support mesh is 700 μm.

Example 3

This example provides a drying method for polyglycollide warp-knitted support meshes for artificial skin, specifically comprising: pre-drying, deep drying, and fabric stress relaxation, which are performed sequentially.

The process of pre-drying comprises: a polyglycollide warp-knitted support mesh, which was aired after being cleaned, was placed in a vacuum drying oven A connected to a water-circulation vacuum pump, and a temperature in the vacuum drying oven A was set to 28° C.; the water-circulation vacuum pump was started and kept running to perform drying treatment on the polyglycollide warp-knitted support mesh under a vacuum degree of 380 Pa for 1.8 h, and then the water-circulation vacuum pump was stopped; air was slowly introduced into the vacuum drying oven A to enable the vacuum drying oven A to return to normal pressure.

The process of deep drying comprises:

(1) The polyglycollide warp-knitted support mesh was taken out of the vacuum drying oven A, and was placed in a vacuum drying oven B connected to a sliding-vane rotary vacuum pump and a nitrogen connecting tube;

(2) At normal temperature, the sliding-vane rotary vacuum pump was started to decrease a vacuum degree of the vacuum drying oven 13 to 40 Pa, then the sliding-vane rotary vacuum pump was stopped, and nitrogen with a purity of 99.22% was introduced into the vacuum drying oven B to enable the vacuum drying oven B to return to normal pressure;

(3) Step (2) was performed four times;

(4) The sliding-vane rotary vacuum pump was started and kept running to perform drying treatment on the polyglycollide warp-knitted support mesh under the vacuum degree of 40 Pa and a temperature of 75° C. for 4.5 h;

(5) Under the condition where the vacuum degree of the vacuum drying oven B is maintained at 40 Pa, the temperature in the vacuum drying oven B was increased to 105° C. at a heating rate of 22° C./h and was maintained at 105° C. to treat the polyglycollide warp-knitted support mesh for 1 h, and then, the sliding-vane rotary vacuum pump was stopped.

The process of fabric stress relaxation comprises: nitrogen was introduced into the vacuum drying oven B at a rate of 0.5 L/min, the temperature in the vacuum drying oven B was increased to 125° C., and the polyglycollide warp-knitted support mesh was treated at the temperature of 125° C. for 4.5 h; then, the vacuum drying oven B was decreased to normal temperature, and the polyglycollide warp-knitted support mesh was taken out of the vacuum drying oven B, so that drying is completed.

The weft tensile strength of the polyglycollide warp-knitted support mesh is 752 MPa, the warp tensile strength of the polyglycollide warp-knitted support mesh is 1420 MPa, the weight of the polyglycollide warp-knitted support mesh is 25 g/m$^2$, and the pore size of the polyglycollide warp-knitted support mesh is 1000 μm.

Contrastive Example 1

Contrastive example 1 differs from Example 1 only in that the process of deep drying in Contrastive example 1 does not comprise Step (5).

According to the drying method in Examples 1-3 and Contrastive example 1, the cleaning process may be performed in a 100,000-level clean room with at a temperature equal to or lower than 30° C. and a humidity equal to or lower than 65%. To maintain a suitable working environment, the air supply rate of the 100,000-level clean room is equal to or greater than 40 m$^3$/h, and the air change rate of air-conditioners is equal to or greater than 15 times/h.

The water content, cleaning solvent content, warp tensile strength, weft tension strength, pore size, and weight of the polyglycollide warp-knitted support meshes in Examples 1-3 and Contrastive example 1 were tested, and the test results are shown in Table 1.

TABLE 1

Test results

| Serial number | Test items | | Example 1 Before drying | Example 1 After drying | Example 2 Before drying | Example 2 After drying | Example 3 Before drying | Example 3 After drying | Contrastive example 1 Before drying | Contrastive example 1 After drying |
|---|---|---|---|---|---|---|---|---|---|---|
| 1 | Tensile strength (MPa) | Weft | 800 | 800 | 861 | 861 | 752 | 752 | 800 | 640 |
| | | Warp | 1300 | 1380 | 1257 | 1267 | 1420 | 1453 | 1300 | 1040 |
| 2 | Weight (g/m$^2$) | | 30 | 30 | 28 | 28 | 25 | 25 | 30 | 29 |
| 3 | Pore size (μm) | | 800 | 800 | 700 | 700 | 1000 | 1000 | 800 | 800 |
| 4 | Water content (%) | | 6.71 | 0 | 4.98 | 0 | 5.34 | 0 | 6.71 | 2.14 |
| 5 | Cleaning solvent content (%) | | 0.67 | 0 | 0.34 | 0 | 0.45 | 0 | 0.67 | 0 |

Note: the weight of the polyglycollide warp-knitted support meshes was detected as stipulated in the FZ/T70010-2006 Standard, the water content of the polyglycollide warp-knitted support meshes was detected as stipulated in Appendix C in the YY1116-2010 Standard, the tensile strength and pore size were detected according to the Q/FJHXY 002-2021 Standard, and the cleaning solvent content was detected through a chemical titration method.

The basic principle, main features, and advantages of the invention are illustrated and described above. Those skilled in the art would appreciate that the invention is not limited to the above examples, and the examples and the description in this specification are merely used to explain the principle of the invention. Various transformations and improvements may be made to the invention without departing from the spirit and scope of the invention, and all these transformations and improvements should fall within the protection scope of the invention. The protection scope of the invention should be defined by the appended claims and their equivalents.

What is claimed is:

1. A drying method for polyglycollide warp-knitted support meshes for artificial skin, specifically comprising: pre-drying, deep drying, and fabric stress relaxation, which are performed sequentially, the pre-drying being completed in a vacuum drying oven A, and the deep drying and the fabric stress relaxation being completed in a vacuum drying oven B, wherein:

the process of pre-drying comprises: placing a polyglycollide warp-knitted support mesh, which is aired after being cleaned, in the vacuum drying oven A which is connected to a water-circulation vacuum pump, and setting a temperature in the vacuum drying oven A as $T_1$; starting the water-circulation vacuum pump, keeping the vacuum drying oven running to treat the polyglycollide warp-knitted support mesh in the vacuum drying oven A under a vacuum degree $P_1$ for a time $t_1$, and then stopping the water-circulation vacuum pump; and slowly introducing air into the vacuum drying oven A to enable the vacuum drying oven A to return to normal pressure;

the process of deep drying comprises: (1) placing the polyglycollide warp-knitted support mesh in the vacuum drying oven B which is connected to a sliding-vane rotary vacuum pump and an inert gas connecting tube; (2) at normal temperature, starting the sliding-vane rotary vacuum pump to decrease a vacuum degree of the vacuum drying oven B to $P_2$, then stopping the sliding-vane rotary vacuum pump, and introducing an inert gas into the vacuum drying oven B to enable the vacuum drying oven B to return to normal pressure; (3) performing Step (2) multiple times; (4) starting the sliding-vane rotary vacuum pump, keeping the sliding-vane rotary vacuum pump running to perform drying treatment on the polyglycollide warp-knitted support mesh in the vacuum drying oven B under a vacuum degree $P_2$ and a temperature $T_2$ for a time $t_2$; and (5) under the condition where the vacuum degree of the vacuum drying oven B is maintained at $P_2$, increasing the temperature in the vacuum drying oven B to $T_3$ at a heating rate T, maintaining the temperature in the vacuum drying oven B at $T_3$ to treat the polyglycollide warp-knitted support mesh for a time $t_3$, and stopping the sliding-vane rotary vacuum pump;

the process of fabric stress relaxation comprises: introducing an inert gas into the vacuum drying oven B at a rate V, increasing the temperature in the vacuum drying box B to $T_4$, treating the polyglycollide warp-knitted support mesh at the temperature $T_4$ for a time $t_4$, and then cooling the vacuum drying box B to normal temperature.

2. The drying method for polyglycollide warp-knitted support meshes for artificial skin according to claim 1, wherein the temperature $T_1$ is 25° C.-35° C., the vacuum degree $P_1$ is 0-400 Pa, and the treatment time $t_1$ is 1-2.5 h.

3. The drying method for polyglycollide warp-knitted support meshes for artificial skin according to claim 1, wherein the inert gas is one of nitrogen, argon, and helium.

4. The drying method for polyglycollide warp-knitted support meshes for artificial skin according to claim 1, wherein the vacuum degree $P_2$ of the vacuum drying oven B is 0-50 Pa, Step (2) is performed two or more times in Step (3), the temperature $T_2$ is 65° C.-75° C., the time $t_2$ is 3-5 h, the heating rate T is 16° C./h-24° C./h, the temperature $T_3$ is 85° C.-105° C., and the time $t_3$ is 1/3-1 h.

5. The drying method for polyglycollide warp-knitted support meshes for artificial skin according to claim 1, wherein in the process of fabric stress relaxation, the rate V is 0.1 L/min-1 L/min, the temperature $T_4$ is 110° C.-130° C., and the time $t_4$ is 3-5 h.

* * * * *